United States Patent
Lam et al.

(10) Patent No.: US 11,956,222 B2
(45) Date of Patent: Apr. 9, 2024

(54) END-TO-END ENCRYPTION FOR MULTIPLE RECIPIENT DEVICES

(71) Applicant: Verizon Patent and Licensing Inc., Basking Ridge, NJ (US)

(72) Inventors: Andrew Wahlon Lam, River Edge, NJ (US); Ashwin Swaminathan, Ashland, MA (US); Wen Zea Kuo, Sudbury, MA (US); Rezwanul Azim, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 420 days.

(21) Appl. No.: 17/466,037

(22) Filed: Sep. 3, 2021

(65) Prior Publication Data

US 2023/0075085 A1     Mar. 9, 2023

(51) Int. Cl.
*H04L 9/40* (2022.01)

(52) U.S. Cl.
CPC ...... *H04L 63/0442* (2013.01); *H04L 63/0414* (2013.01); *H04L 63/0876* (2013.01); *H04L 63/1416* (2013.01); *H04L 63/1425* (2013.01); *H04L 63/1466* (2013.01)

(58) Field of Classification Search
CPC ............ H04L 63/0442; H04L 63/0414; H04L 63/0876; H04L 63/1416; H04L 63/1425; H04L 63/1466
See application file for complete search history.

(56) References Cited

U.S. PATENT DOCUMENTS

| | | | | |
|---|---|---|---|---|
| 2018/0139314 A1* | 5/2018 | Acton | ............... | H04M 1/2757 |
| 2021/0321261 A1* | 10/2021 | Bernardi | ............... | H04W 4/14 |
| 2022/0284210 A1* | 9/2022 | Ding | ............... | G06V 40/1312 |

FOREIGN PATENT DOCUMENTS

| | | | | |
|---|---|---|---|---|
| KR | 101666594 B1 | * | 10/2016 | ............. H04L 69/00 |
| KR | 20220005963 A | * | 12/2020 | ............. H04L 63/065 |
| WO | WO-2020088598 A1 | * | 5/2020 | ............. G06F 21/552 |

* cited by examiner

*Primary Examiner* — Lynn D Feild
*Assistant Examiner* — Saad Ahmad Abdullah

(57) ABSTRACT

One or more computing devices, systems, and/or methods for end-to-end encryption for multiple recipient devices are provided. A first registration, comprising a first device public key, is created for a first device. A second registration, comprising a second device public key, is created for a second device. A first notify message of the second registration and second device public key is provided to the first device. A second notify message is provided to the second device of the first registration and first device public key. A secure communication invite is routed to the first device. An encrypted message, comprising a first device private key, is routed from the first device to the second device. End-to-end encrypted communication between a sender device and the first device and the second device using the first device private key is facilitated.

20 Claims, 8 Drawing Sheets

END-TO-END ENCRYPTION FOR MULTIPLE RECIPIENT DEVICES

BACKGROUND

Many consumers have more than one communication device capable of communicating over a communication network. For example, a user may have a smart phone, a tablet, and/or a wearable watch that are capable of data and/or voice communication. Instead of each communication device having a different mobile device number, the user may be capable of having each communication device share the same mobile device number. Thus, an incoming call or incoming message targeting the mobile device number may be routed to all of the communication devices sharing the same mobile device number.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
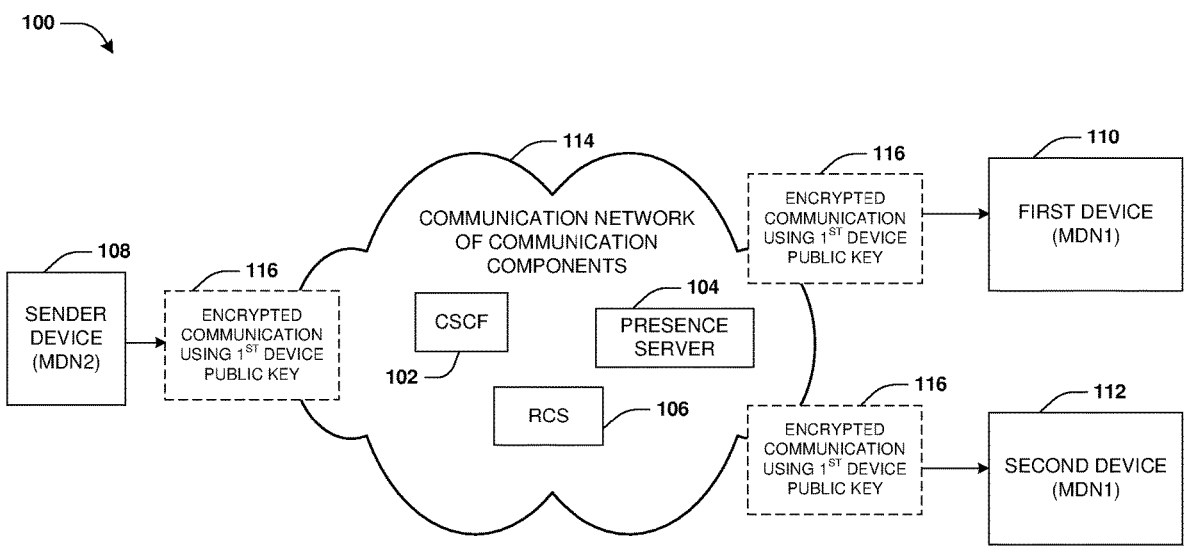
FIG. 1 is a diagram illustrating an example scenario associated with end-to-end encryption for multiple recipient devices.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for end-to-end encryption for multiple recipient devices are provided. End-to-end encryption may be implemented to protect the privacy of users so that messages cannot be intercepted and read by malicious entities. With end-to-end encryption, message content of messages may be encrypted at an application layer using public/private key pairs. For example, a first device and a second device that are to communicate with one another may each create public/private key pairs. In an example, the first device may create a public key and a private key. The first device may provide the public key to the second device. The second device can use the public key to encrypt messages that can only be decrypted using the private key held by the first device. If another entity intercepts an encrypted message being transmitted from the second device to the first device, then that entity cannot decrypt the encrypted message because the entity does not have the private key of the first device. When the first device receives an encrypted message from the second device, the first device can decrypt the encrypted message using the private key in order to access the message.

Similarly, the second device may create a public key and a private key. The second device may provide the public key to the first device. The first device can use the public key to encrypt messages that can only be decrypted using the private key held by the second device. If another entity intercepts an encrypted message being transmitted from the first device to the second device, then that entity cannot decrypt the encrypted message because the entity does not have the private key of the second device. When the second device receives an encrypted message from the first device, the second device can decrypt the encrypted message using the private key in order to access the message. In this way, end-to-end encryption can improve the privacy of two devices communicating with one another.

Unfortunately, end-to-end communication only works where there is merely a single recipient device. This is because the recipient device does not share its private key with other devices, and thus only the recipient device can decrypted messages from a sender that are encrypted using the public key of the recipient device. If there are multiple recipient devices, then the other recipient devices will not have the private key of the recipient device and will be unable to decrypt the encrypted messages. In some embodiments, this situation can arise where there are multiple recipient devices that share the same mobile device number. For example, a user may own multiple devices, such as a phone, a smart watch, and/or a tablet. The devices may be configured and registered with a communication carrier for sharing the same mobile device number. Thus, an incoming call or incoming message targeting the mobile device number may be routed to all of the communication devices sharing the same mobile device number. However, if a sender device encrypts a message using a public key received from one of the devices of the user (e.g., a public key created by the phone and provided to the sender device), then only that device can decrypt the encrypted message because only that device has the private key. The other devices of the user will receive the encrypted message, but will be unable to decrypt the encrypted message.

Accordingly, as provided here, end-to-end encryption for multiple recipient devices is provided, as illustrated by system 100 of FIG. 1. For example, end-to-end encryption is provided for multiple devices that share the same mobile device number by leveraging communication components within an IP Multimedia Subsystem (IMS), such as a call session control function (CSCF) communication component 102, a presence server 104, a rich communication suite (RCS) server 106, and/or other communication components of a communication network 114. A user may own a first device 110 (e.g., a cell phone), a second device 112 (e.g., a smart watch), and/or other communication devices that have communication functionality for communicating with other devices over the communication network 114. It may be appreciated that end-to-end encryption may be implemented for any number of secondary devices (e.g., the second device 112, a third device such as a tablet, etc.). The first device 110 and the second device 112 may share the same first mobile device number. Thus, phone calls, messages, and/or other communication directed to the first mobile device number will be routed to both the first device 110 and the second device 112 that are assigned the same first mobile device number. A sender device 108 may be assigned a second mobile device number different than the first mobile device number of the first device 110 and the second device 112.

The first device 110 may create a first device public key and first device private key for communicating with the sender device 108. The first device 110 may send a first registration request, comprising the first device public key and an indication of the first mobile device number of the first device 110, to the CSCF communication component 102. Accordingly, the CSCF communication component 102 creates a first registration for the first device 110. The first registration includes the first device public key. The first registration created by the CSCF communication component 102 for the first device 110 may be associated with the first mobile device number of the first device 110.

The first device 110 may transmit a first subscribe request to the CSCF communication component 102 in order to subscribe to event registration information associated with the first mobile device number. In this way, the CSCF communication component 102 may generate a first device event subscription for the first device 110.

The first device 110 may transmit a publish request to the CSCF communication component 102, which is routed to the presence server 104. The presence server 104 generates a presence indicator for the first device 110 to indicate that the first device 110 supports end-to-end encryption.

The second device 112 may create a second device public key and second device private key. The second device 112 may send a second registration request, comprising the second device public key and an indication of the first mobile device number of the second device 112, to the CSCF communication component 102. Accordingly, the CSCF communication component 102 creates a second registration for the second device 112. The second registration may comprise the second device public key. The second registration created by the CSCF communication component 102 for the second device 112 may be associated with the first mobile device number of the second device 112. The first registration previously created by the CSCF communication component 102 for the first device 110 may be associated with the first mobile device number of the first device 110. Accordingly, the CSCF communication component 102 can evaluate the first registration and the second registration to determine that the first device 110 and the second device 112 are both sharing the same first mobile device number and are both subscribed to receive notify messages of registrations using the first mobile device number. The CSCF communication component 102 transmits a first notify message to the first device 110 regarding the second registration and the second public device key.

The second device 112 may transmit a second subscribe request to the CSCF communication component 102 in order to subscribe to event registration information associated with the first mobile device number. In this way, the CSCF communication component 102 may generate a second device event subscription for the second device 112. Accordingly, the CSCF communication component 102 transmits a second notify message to the second device 112 regarding the first registration and the first public device key. In this way, the second device 112 now has the first device public key of the first device 110 and the second device 112 is aware that the second device 112 supports end-to-end encryption based upon, for example, the presence indicator maintained by the presence server 104.

The second device 112 may transmit a secure communication invite, comprising the second device public key of the second device 112, to the CSCF communication component 102, which routes the secure communication invite to the RCS server 106. The RCS server 106 acts as a routing agent that routes the secure communication invite to the first device 110. The first device 110 determines whether the secure communication invite is valid or if the second device 112 is being spoofed. In particular, the first device 110 determines whether the second device public key in the secure communication invite matches the second device public key previously received in the first notify message regarding the second device registration. If the second device public keys do not match, then the secure communication invite is ignored and/or a remedial action is taken such as triggering an alert of the spoofing attack of the second device 112. If the second device public keys match, then the secure communication invite is validated.

Upon validating the secure communication invite, the first device 110 may create an encrypted message, comprising the first device private key, which is encrypted using the second device public key. The encrypted message may be routed as a message session relay protocol message through the RCS server 106 to the second device 112. The second device 112 can use the second device private key to decrypt the encrypted message that was encrypted using the second device public key. In this way, the second device 112 obtains access to the first device private key.

At this point, the first device 110 has securely shared the first device private key with the second device 112 so that both the first device 110 and the second device 112 have the first device private key. Accordingly, end-to-end encrypted communication between the sender device 108 and both the first device 110 and the second device 112 can be facilitated. In particular, the first device 110 shares the first device public key with the sender device 108. The sender device 108 creates encrypted communication 116 using the first device public key. The encrypted communication 116 specifies the first mobile device number as the recipient. The sender device 108 transmits the encrypted communication 116 through the communication network 114, which is routed to both the first device 110 and the second device 112 because both the first device 110 and the second device 112 share the same first mobile device number. Both the first device 110 and the second device 112 can decrypt the encrypted communication 116 using the first device private key. In this way, end-to-end encrypted communication is provided for multiple recipients that share the same mobile device number, such as the second device 112, a third device (e.g., a tablet), a fourth device (e.g., a smart watch), etc.

Figure 2:
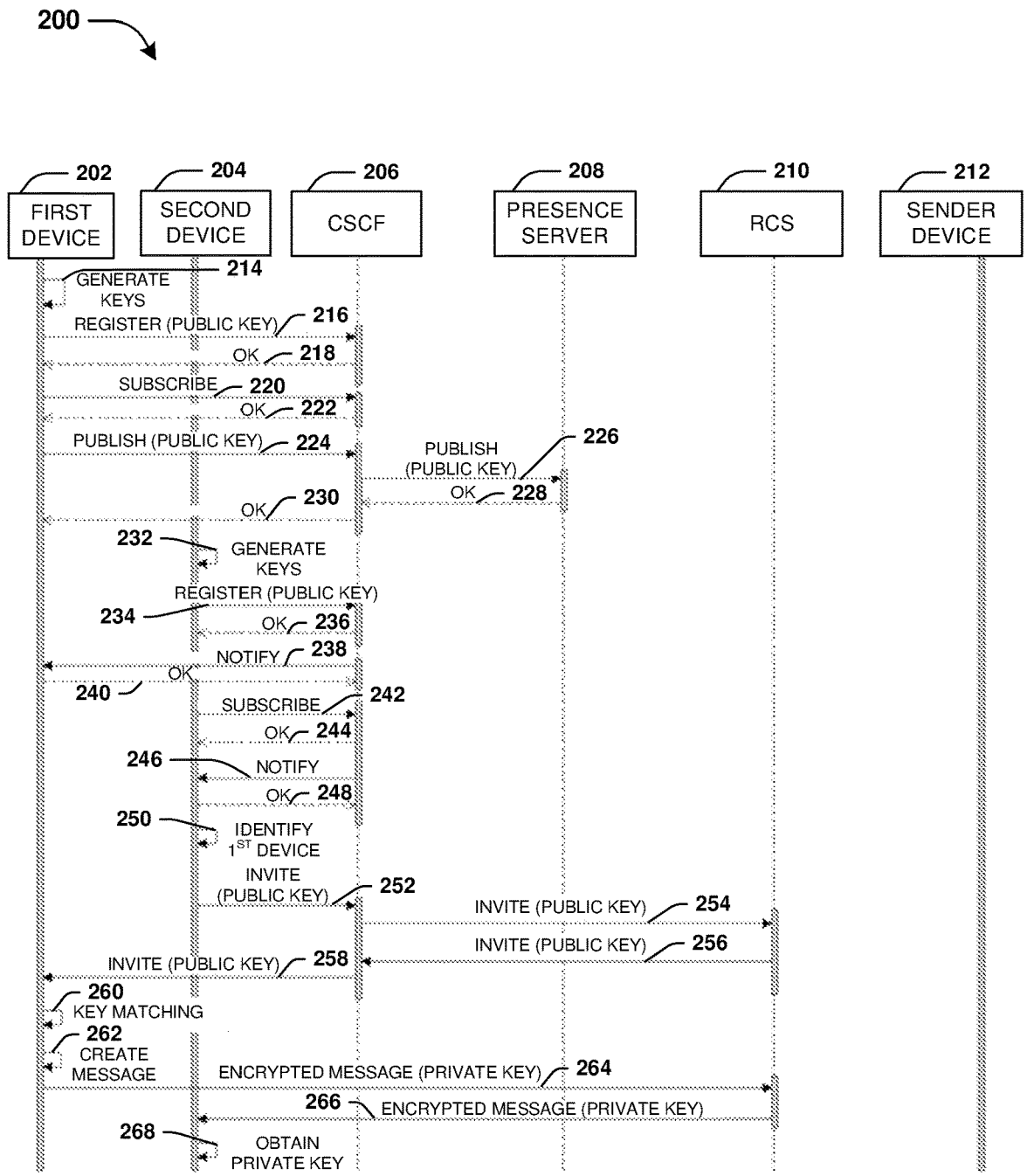
FIG. 2 is a flow chart illustrating an example scenario associated with end-to-end encryption for multiple recipient devices.

FIG. 2 illustrates a flow chart 200 for facilitating end-to-end encryption for multiple recipient devices. A communication network may comprise a CSCF communication component 206, a presence server 208, and an RCS server 210. A first device 202 and a second device 204 may be configured to communicate over the communication network, such as with a sender device 212 that is to send communication to the first device 202 and the second device 204. The first device 202 and the second device 204 may share the same first device mobile number, while the sender device may have a second mobile device number different than the first device mobile number.

In some embodiments, end-to-end communication is facilitated where the sender device 212 can send an encrypted message that is routed to both the first device 202 and the second device 204, both the first device 202 and the second device 204 will both be capable of decrypting the encrypted message. In particular, the first device 202 may create a first device public key and first device private key for communicating with the sender device 212, at step 214. At step 216, the first device 202 may send a first registration request, comprising the first device public key, to the CSCF communication component 206. Accordingly, the CSCF communication component 206 creates a first registration for the first device 202, and transmits back a confirmation message, at step 218. The first registration may comprise the first device public key.

At step 220, the first device 202 may transmit a first subscribe request to the CSCF communication component 206 in order to subscribe to event registration information associated with the first mobile device number. In this way, the CSCF communication component 206 may generate a first device event subscription for the first device 202, and transmits back a confirmation message, at step 222.

At step 224, the first device 202 may transmit a publish request to the CSCF communication component 206. At step 226, the CSCF communication component 206 routes the publish request to the presence server 208. The presence server 208 generates a presence indicator for the first device 202 to indicate that the first device 202 supports end-to-end encryption, and transmits back a confirmation message to the CSCF communication component 206, as step 228. At step 230, the CSCF communication component 206 routes the confirmation message back to the first device 202.

At step 232, the second device 204 may create a second device public key and second device private key. At step 234, second device 204 may send a second registration request, comprising the second device public key, to the CSCF communication component 206. Accordingly, the CSCF communication component 206 creates a second registration for the second device 204, and sends a confirmation message, at step 236. The second registration may comprise the second device public key.

At step 238, the CSCF communication component 206 transmits a first notify message to the first device 202 regarding the second registration and the second public device key. At step 240, the first device 202 may transmit a confirmation message to the CSCF communication component 206.

At step 242, the second device 204 may transmit a second subscribe request to the CSCF communication component 206 in order to subscribe to event registration information associated with the first mobile device number. In this way, the CSCF communication component 206 may generate a second device event subscription for the second device 204, and transmit back a confirmation message to the second device 204, at step 244.

At step 246, the CSCF communication component 206 transmits a second notify message to the second device 204 regarding the first registration and the first public device key. At step 248, the second device 204 transmits a confirmation message to the CSCF communication component 206.

At step 250, the second device 204 becomes aware that the second device supports end-to-end encryption such as based upon the presence indicator maintained by the presence server 208, and the second device 204 now has the first device public key of the first device 202.

At step 252, the second device 204 transmits a secure communication invite, comprising the second device public key of the second device 204, to the CSCF communication component 206. At step 254, the CSCF communication component 206 routes the secure communication invite to the RCS server 210. At step 256, the RCS server 210 acts as a routing agent that routes the secure communication invite back to the CSCF communication component 206 that routes the secure communication invite to the first device 202, at step 258.

At step 260, first device 202 determines whether the secure communication invite is valid or if the second device 204 is being spoofed. In particular, the first device 202 determines whether the second device public key in the secure communication invite matches the second device public key previously received in the first notify message regarding the second device registration. If the public keys of the second device do not match, then the secure communication invite is ignored and/or a remedial action is taken such as triggering an alert of the spoofing attack of the second device 204. If the public keys of the second device match, then the secure communication invite is validated.

Upon validating the secure communication invite, the first device 202 may create a message comprising the first device private key, which is encrypted using the second device public key to create an encrypted message, at step 262. At step 264, the first device 202 transmits the encrypted message to the RCS server 210. At step 266, the RCS server 210 routes the encrypted message to the second device 204.

At step 268, the second device 204 can use the second device private key to decrypt the encrypted message that was encrypted using the second device public key. In this way, the second device 204 obtains access to the first device private key from the decrypted message.

At this point, the first device 202 has securely shared the first device private key with the second device 204 so that both the first device 202 and the second device 204 have the first device private key. Accordingly, end-to-end encrypted communication between the sender device 212 and both the first device 202 and the second device 204 can be facilitated. In particular, the first device 202 shares the first device public key with the sender device 212. The sender device 212 creates encrypted communication using the first device public key. The sender device 212 transmits the encrypted communication, with the first mobile device number as the recipient, through the communication network. The encrypted communication is routed to both the first device 202 and the second device 204 because both the first device 202 and the second device 204 share the same first mobile device number. Both the first device 202 and the second device can decrypt the encrypted communication using the first device private key. In this way, end-to-end encrypted communication is provided for multiple recipients that share the same mobile device number.

Figure 3:
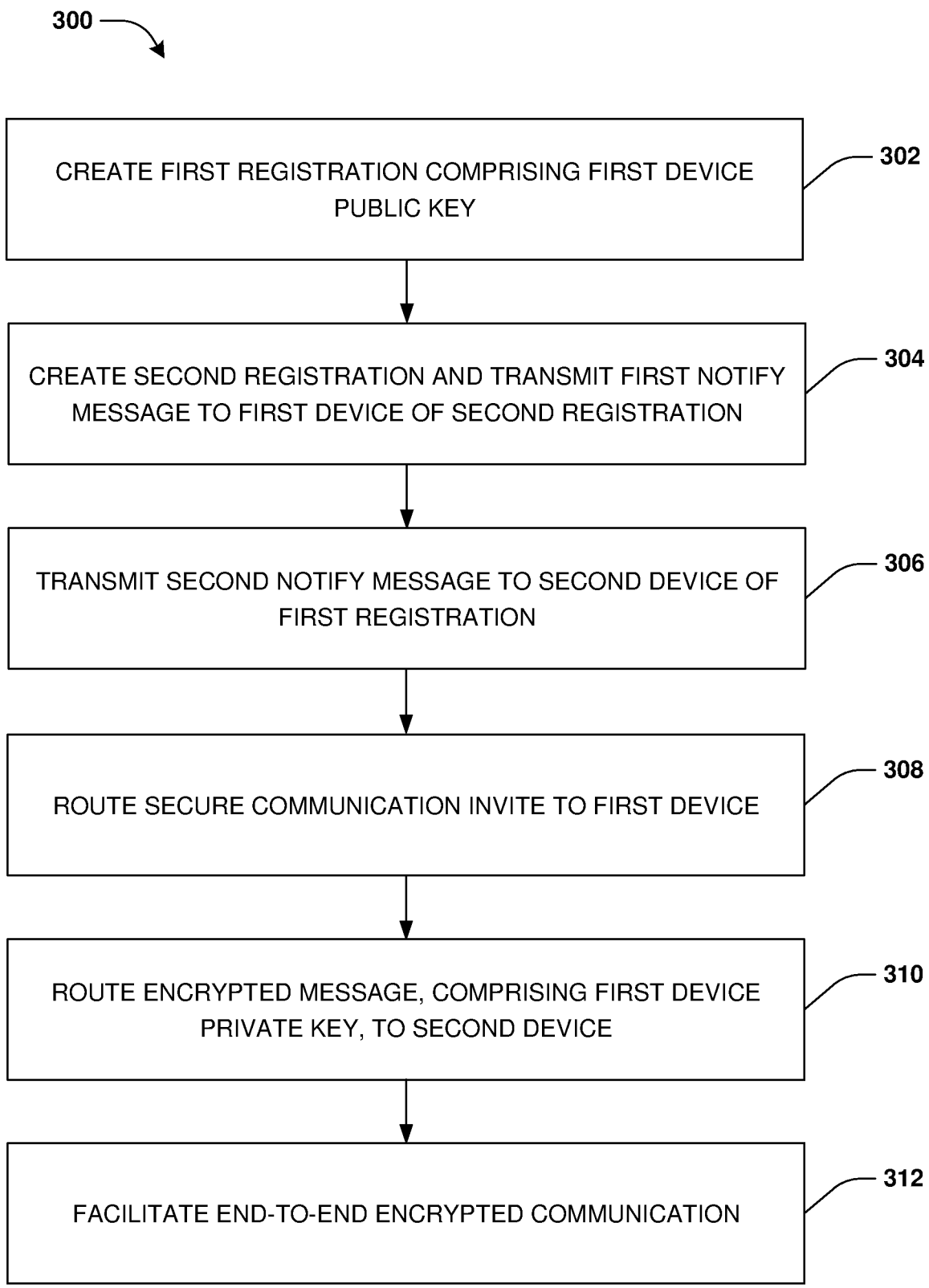
FIG. 3 is a flow chart illustrating an example method, implemented by a communication component, for end-to-end encryption for multiple recipient devices.

Embodiments of facilitating end-to-end encryption for multiple recipient devices are illustrated by an exemplary method 300 of FIG. 3. In some embodiments, the method 300 may be implemented by one or more communication components of a communication network, such as a CSCF communication component, a presence server, and/or an RCS server. A first device may be configured with a mobile device number for communicating over the communication network. During operation 302 of method 300, a first registration may be created for the first device in response to receiving a first registration request from the first device. The first registration request may comprise a first device public key of the first device. In an example, the first device public key may be comprised within a contact header of the first registration request. The first device public key may be part of a key pairing also including a first device private key maintained by the first device. The first registration may include the first device public key. In some embodiments, the first registration may be created by the communication component.

In response to receiving a subscribe request from the first device for event registration information, a first device event subscription may be generated for the first device. In some embodiments, the first device event subscription may be generated by the communication component. The first device event subscription may trigger the communication component to provide a notify message to the first device of any subscriptions made using the mobile device number of the first device, such as where a second device sharing the mobile device number registers with the communication component.

In response to receiving a publish request from the first device, the communication component may route the publish request to a presence server that generates a presence indicator for the first device to indicate to other devices such as the second device that the first device supports end-to-end encryption. The presence indicator may include the first device public key received within the publish request.

During operation 304 of method 300, a second registration may be created for the second device sharing the mobile device number in response to receiving a second registration request from the second device. The second registration request may comprise a second device public key of the second device. In an example, the second device public key may be comprised within a contact header of the second registration request. The second device public key may be part of a key pairing also including a second device private key maintained by the second device. The second registration may include the second device public key. In some embodiments, the second registration may be created by the communication component. In response to creating the second registration, the communication component may transmit a first notify message to the first device regarding the second registration and the second device public key. The first notify message may be transmitted based upon the first device event subscription maintained by the communication component.

In response to receiving a subscribe request from the second device for event registration information, a second device event subscription may be generated for the second device. In some embodiments, the second device event subscription may be generated by the communication component. The second device event subscription may trigger the communication component to provide a notify message to the second device of any subscriptions made using the mobile device number of the second device. Accordingly, during operation 306 of method 300, a second notify message is transmitted to the second device based upon the second device event subscription maintained by the communication component. The second notify message may comprise the first device public key and may provide an indication of the first registration of the first device.

During operation 308 of method 300, a secure communication invite, comprising the second device public key, may be routed from the second device to the first device. During operation 310 of method 300, an encrypted message, comprising the first device private key, is routed from the first device to the second device. The encrypted message may be encrypted using the second device public key of the second device in response to the first device validating the secure communication invite. The secure communication invite may be validated/authenticated based upon the first device determining that the second device public key within the secure communication invite matches the second device public key within the first notify message. In some embodiments, the encrypted message is routed as a message session relay protocol message through a rich communication suite session by the RCS server acting as a routing agent. The second device may use the second device private key to decrypt the encrypted message in order to obtain the first device private key from the decrypted message for use by the second device.

During operation 312 of method 300, end-to-end encrypted communication between a sender device and the first device and second device using the first device private key may be facilitated. For example, encrypted communication, encrypted by the sender device using the first device public key, may be routed from the sender device to the first device and the second device based upon the first device and the second device having the same mobile device number. The first device and the second device can utilize the first device private key to decrypt the encrypted communication.

Figure 4:
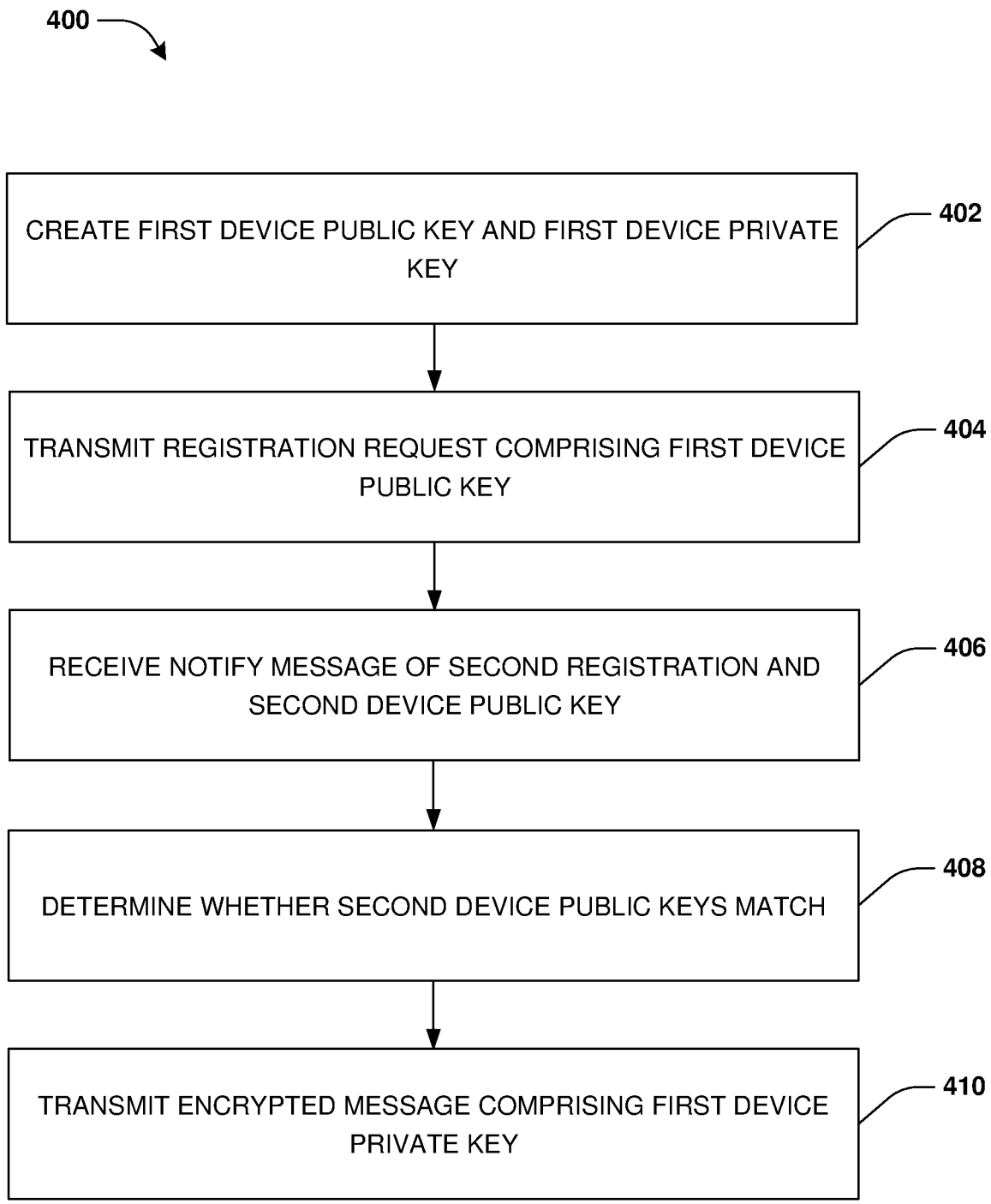
FIG. 4 is a flow chart illustrating an example method, implemented by a first device, for end-to-end encryption for multiple recipient devices.

Embodiments of facilitating end-to-end encryption for multiple recipient devices are illustrated by an exemplary method 400 of FIG. 4. In some embodiments, the method 400 may be implemented by a first device (e.g., a primary communication device such as a smart phone or any other type of communication device). The first device may be configured with a mobile device number for communicating over the communication network. During operation 402 of method 400, the first device may generate a first device public key and a first device private key for performing end-to-end encrypted communication with a sender device.

During operation 404 of method 400, the first device may transmit a registration request, comprising the first device public key, to a communication component for generating a first registration for the first device having the mobile device number. In some embodiments, the first device public key may be included within a content header of the registration request. The first registration may comprise the first device public key.

In some embodiments, the first device may transmit a subscribe request to the communication component to register to receive notify messages of devices with the mobile device number registering with the communication component. In some embodiments, the first device may transmits a publish request, comprising the first device public key, to a presence server for generating a presence indicator for the first device. The presence indicator may comprise the first device public key. The presence indicator may be used as an indication to a second device sharing the mobile device number that the first device supports end-to-end encryption.

During operation 406 of method 400, the first device may receive a notify message from the communication component based upon the first device registering to receive the notify messages of devices with the mobile device number registering with the communication component. The notify message may comprise an indication of a second registration of the second device with the mobile device number registering with the communication component. The notify message may comprise the second device public key of the second device.

In response to receiving a secure communication invite comprising the second device public key, the first device may determine whether the second device public key within the secure communication invite matches the second device public key from the notify message, during operation 408 of method 400. If the second device public key within the secure communication invite does not match the second device public key from the notify message, then the first device may ignore the secure communication invite and/or generate an alert that the second device may be being spoofed.

In response to the second device public key within the secure communication invite matching the second device public key from the notify message, the first device may generate an encrypted message comprising the first device private key of the first device. The encrypted message may be encrypted with the second device public key of the second device. During operation 410 of method 400, the encrypted message may be transmitted to the second device that can decrypted the encrypted message using the second device private key in order to obtain the first device private key from the decrypted message for use in performing end-to-end encrypted communication with the sender device.

The first device private key may be used by the first device and the second device to perform end-to-end encrypted communication with the sender device. The communication from the sender device may be transmitted to both the first device and the second device based upon the first device and the second device having the same mobile device number. The communication may be encrypted by the sender device using the first device public key, and may be decrypted by the first device and the second device using the first device private key.

Figure 5:
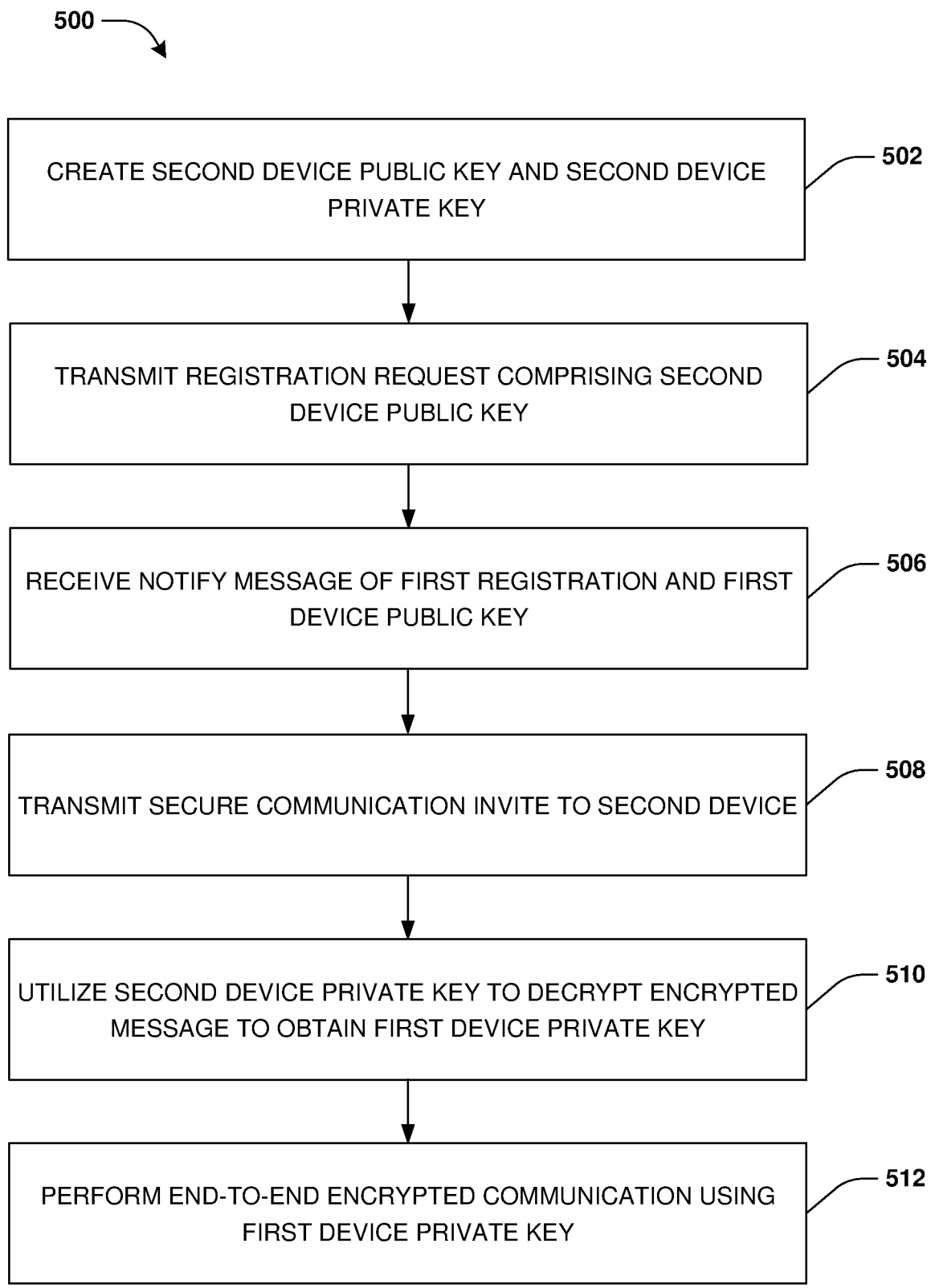
FIG. 5 is a flow chart illustrating an example method, implemented by a second device, for end-to-end encryption for multiple recipient devices.

Embodiments of facilitating end-to-end encryption for multiple recipient devices are illustrated by an exemplary method 500 of FIG. 5. In some embodiments, the method 500 may be implemented by a second device (e.g., a secondary communication device such as a smart watch or any other type of communication device). The second device may be configured with a mobile device number for communicating over the communication network. The second device may share the mobile device number with a first device configured to use a first device private key for performing end-to-end communication with a sender device. During operation 502 of method 500, the second device may generate a second device public key and a second device private key.

During operation 504 of method 500, a registration request, comprising the second device public key, may be transmitted to a communication component for generating a second registration for the second device. The second registration may comprise the second device public key. The second device may transmit a subscription request to the communication component to register for receiving notify messages of devices with the mobile device number registering with the communication component. Accordingly, the second device may receive a notify message from the communication component, during operation 506 of method 500. The notify message may comprise an indicator of a first registration of the first device and may comprise a first device public key of the first device.

During operation 508 of method 500, the second device may transmit a secure communication invite, comprising the second device public key, to the second device. During operation 510 of method 500, the second device may utilize the second device private key to decrypt an encrypted message comprising the first device private key encrypted by the first device using the second device public key. During operation 512 of method 500, the second device may utilize the first device private key to perform end-to-end encrypted communication with the sender device.

The first device private key may be used by the first device and the second device to perform end-to-end encrypted communication with the sender device. The communication from the sender device may be transmitted to both the first device and the second device based upon the first device and the second device having the same mobile device number. The communication may be encrypted by the sender device using the first device public key, and may be decrypted by the first device and the second device using the first device private key.

According to some embodiments, a method is provided. The method includes in response to receiving a first registration request, comprising a first device public key, from a first device associated with a mobile device number, creating a first registration comprising the first device public key; in response to receiving a second registration request, comprising a second device public key, from a second device associated with the mobile device number, creating a second registration comprising the second device public key and transmitting a first notify message to the first device of the second registration and second device public key; transmitting a second notify message to the second device of the first registration and first device public key; routing a secure communication invite, comprising the second device public key, from the second device to the first device; routing an encrypted message, comprising a first device private key, from the first device to the second device, wherein the encrypted message is encrypted using the second device public key in response to the first device authenticating the second device public key within the secure communication invite with the second device public key within the first notify message; and facilitating end-to-end encrypted communication between a sender device and the first device and the second device using the first device private key.

According to some embodiments, the method includes in response to receiving a subscribe request from the first device for event registration information, generating a first device event subscription; and transmitting the first notify message to the first device based upon the first device event subscription.

According to some embodiments, the method includes in response to receiving a subscribe request from the second device for event registration information, generating a second device event subscription; and transmitting the second notify message to the second device based upon the second device event subscription.

According to some embodiments, the method includes in response to receiving a publish request from the first device, generating a presence indicator for the first device, wherein the presence indicator comprises the first device public key received within the publish request; and utilizing the presence indicator as an indication to the second device that the first device supports end-to-end encryption.

According to some embodiments, the method includes routing encrypted communication from the sender device to the first device and to the second device based upon the first device and the second device having the same mobile device number.

According to some embodiments, the encrypted communication is encrypted by the sender device using the first device public key, and wherein the encrypted communication can be decrypted by the first device and the second device using the first device private key.

According to some embodiments, the encrypted message is decrypted using a second device private key of the second device to obtain the first device private key for use by the second device.

According to some embodiments, the method includes routing the encrypted message as message session relay protocol message through a rich communication suite session by a routing agent.

According to some embodiments, the first device public key is included within a contact header of the first registration request.

According to some embodiments, the second device public key is included within a contact header of the second registration request.

According to some embodiments, a first device is provided. The first device comprises a processor coupled to memory, the processor configured to execute instructions to perform operations. The operations include creating a first device public key and a first device private key for performing end-to-end encrypted communication with a sender device; transmitting a registration request, comprising the first device public key, to a communication component for generating a first registration for the first device having a mobile device number, wherein the first registration comprises the first device public key; receiving a notify message from the communication component, wherein the notify message comprises an indication of a second registration of a second device having the mobile device number and comprising a second device public key of the second device; in response to receiving a secure communication invite comprising the second device public key, determining whether the second device public key within the secure communication invite matches the second device public key within the notify message; and in response to a match being determined, transmitting an encrypted message comprising the first device public key encrypted using the second device public key to the second device for use in performing end-to-end encrypted communication between the second device and the sender device.

According to some embodiments, the first device private key is used by the first device and the second device to perform end-to-end encrypted communication with the sender device, and wherein communication from the sender device is transmitted to both the first device and the second device based upon the first device and the second device both having the same mobile device number, wherein the communication is encrypted using the first device public key and can be decrypted by the first device and the second device using the first device private key.

According to some embodiments, the operations include transmitting a publish request, comprising the first device public key to a presence server for generating a presence indicator for the first device, wherein the presence indicator comprises the first device public key; and utilizing the presence indicator as an indication to the second device that the first device supports end-to-end encryption.

According to some embodiments, the operations include in response to determining that the second device public key within the secure communication invite does not match the second device public key within the notify message, refraining from creating and transmitting the encrypted message.

According to some embodiments, the operations include in response to determining that the second device public key within the secure communication invite does not match the second device public key within the notify message, identifying a spoofing attack of the second device.

According to some embodiments, the operations include including the first device public key within a contact header of the registration request.

According to some embodiments, the operations include transmitting a subscribe request to the communication component to register for receiving notify messages of devices with the mobile device number registering with the communication component.

According to some embodiments, a non-transitory computer-readable medium storing instructions that when executed facilitate performance of operations, is provided. The operations include creating a second device public key and a second device private key by a second device sharing a mobile device number with a first device configured to use a first device private key for performing end-to-end encrypted communication with a sender device; transmitting a registration request, comprising the second device public key, to a communication component for generating a second registration for the second device, wherein the second registration comprises the second device public key; receiving a notify message from the communication component, wherein the notify message comprises an indication of a first registration of the first device and comprising a first device public key of the first device; transmitting a secure communication invite, comprising the second device public key, to the second device; utilizing the second device private key to decrypt an encrypted message comprising the first device private key encrypted by the first device using the second device public key; and performing end-to-end encrypted communication with the sender device using the first device private key.

According to some embodiments, the first device private key is used by the first device and the second device to perform end-to-end encrypted communication with the sender device, and wherein communication from the sender device is transmitted to both the first device and the second device based upon the first device and the second device both having the same mobile device number, wherein the communication is encrypted using the first device public key and can be decrypted by the first device and the second device using the first device private key.

According to some embodiments, the operations include transmitting a subscribe request to the communication component to register for receiving notify messages of devices with the mobile device number registering with the communication component.

Figure 6:
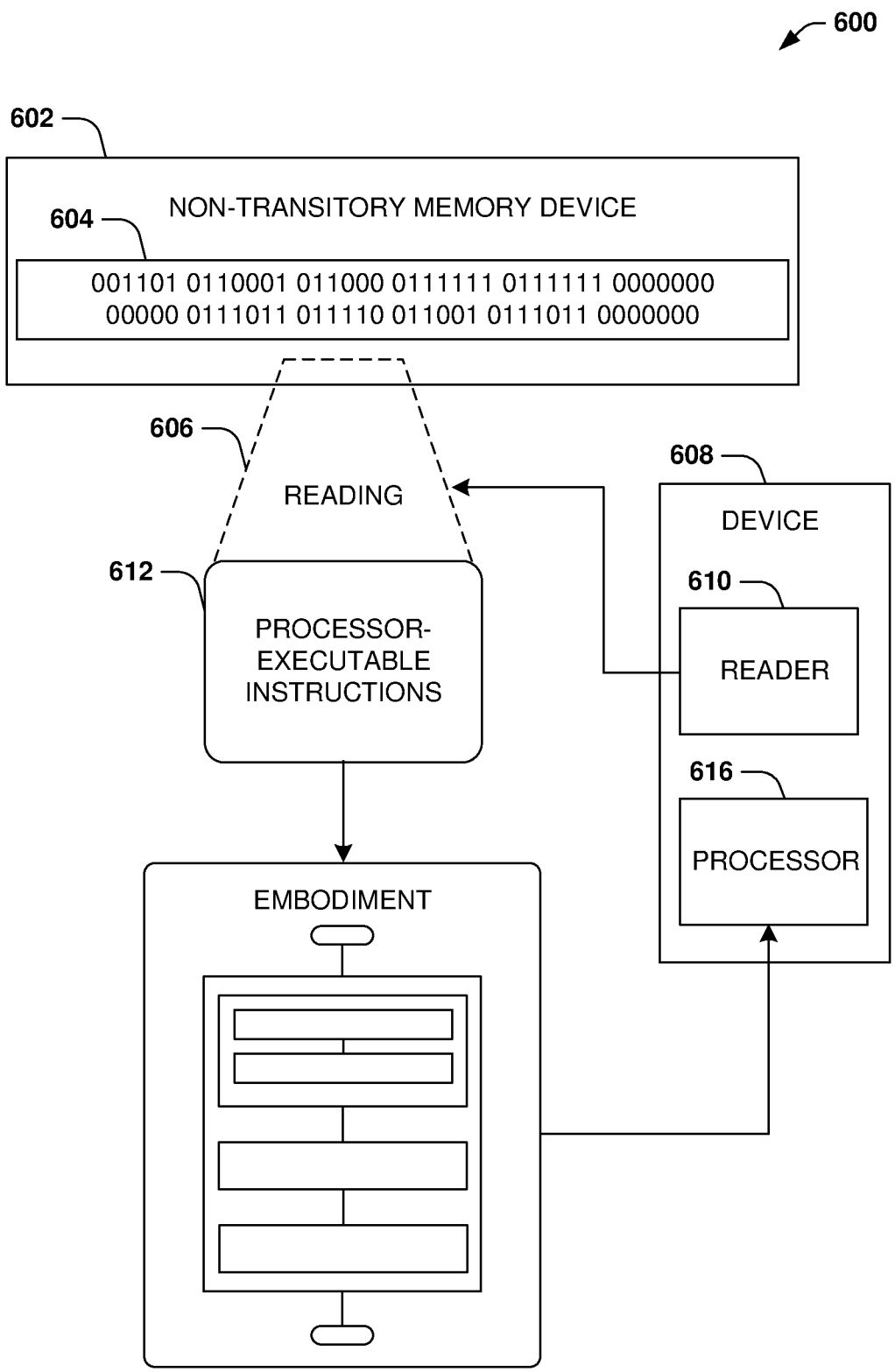
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 300 of FIG. 3, at least some of the example method 400 of FIG. 4, and/or at least some of the example method 500 of FIG. 5, for example. In some embodiments, the processor-executable instructions 612 are configured to cause implementation of a system, such as at least some of the example system 100 of FIG. 1.

Figure 7:
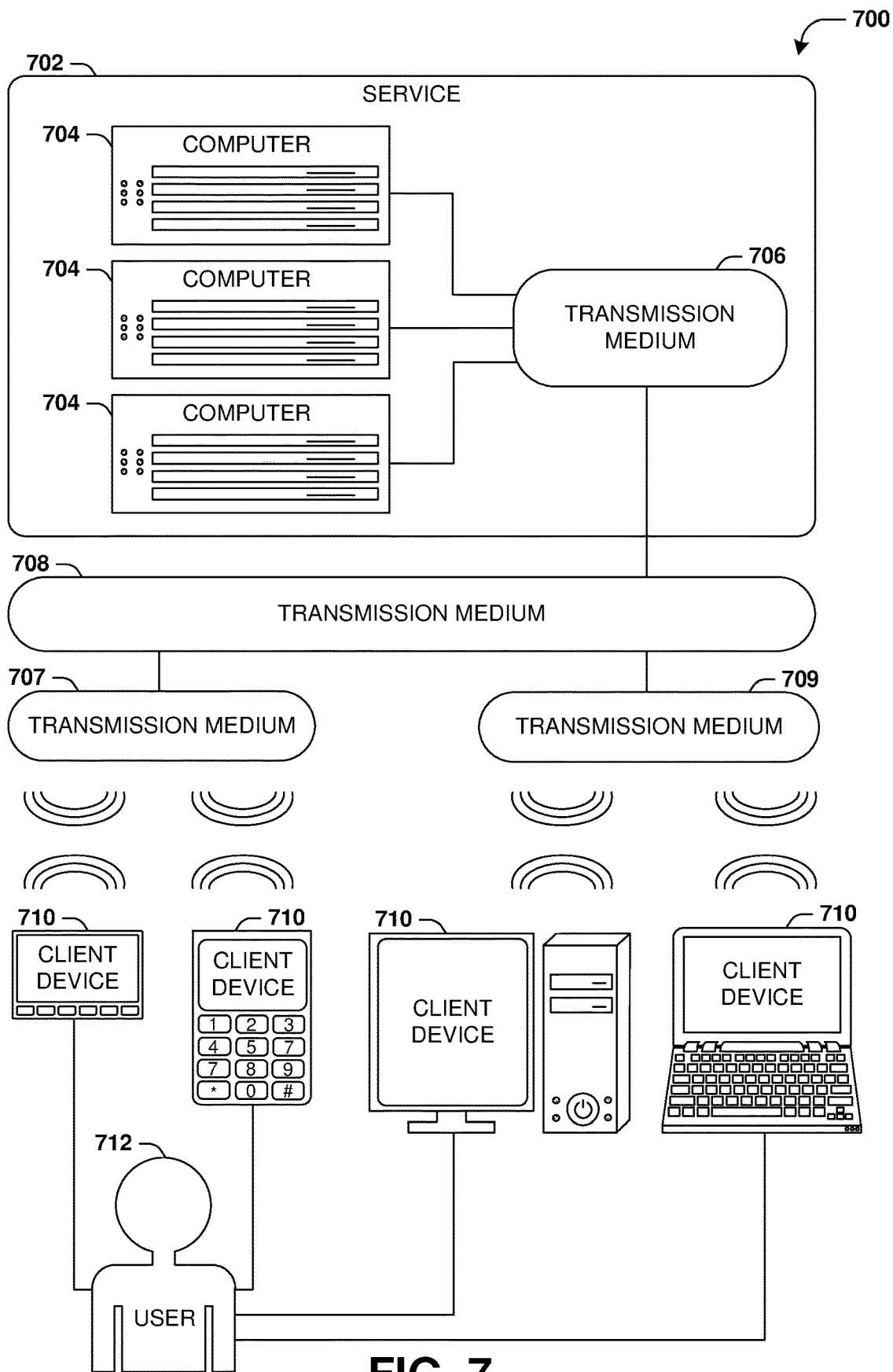
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
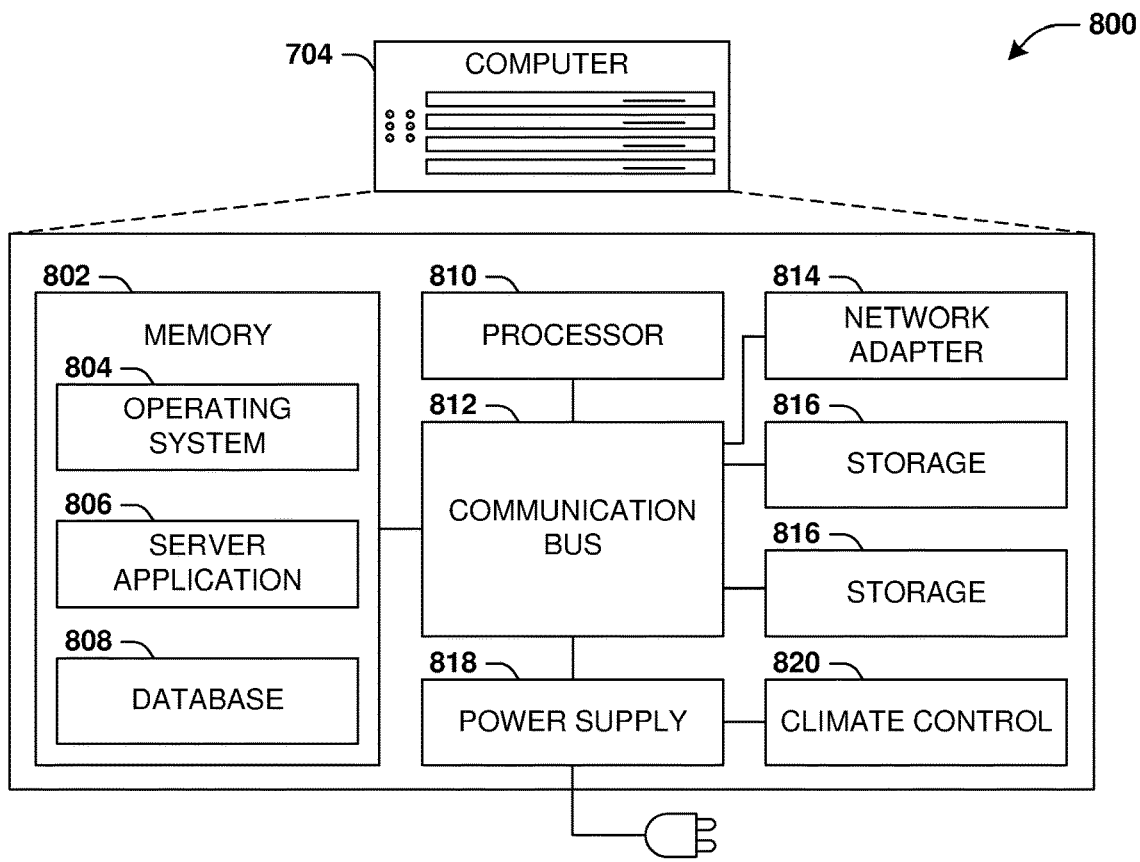
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
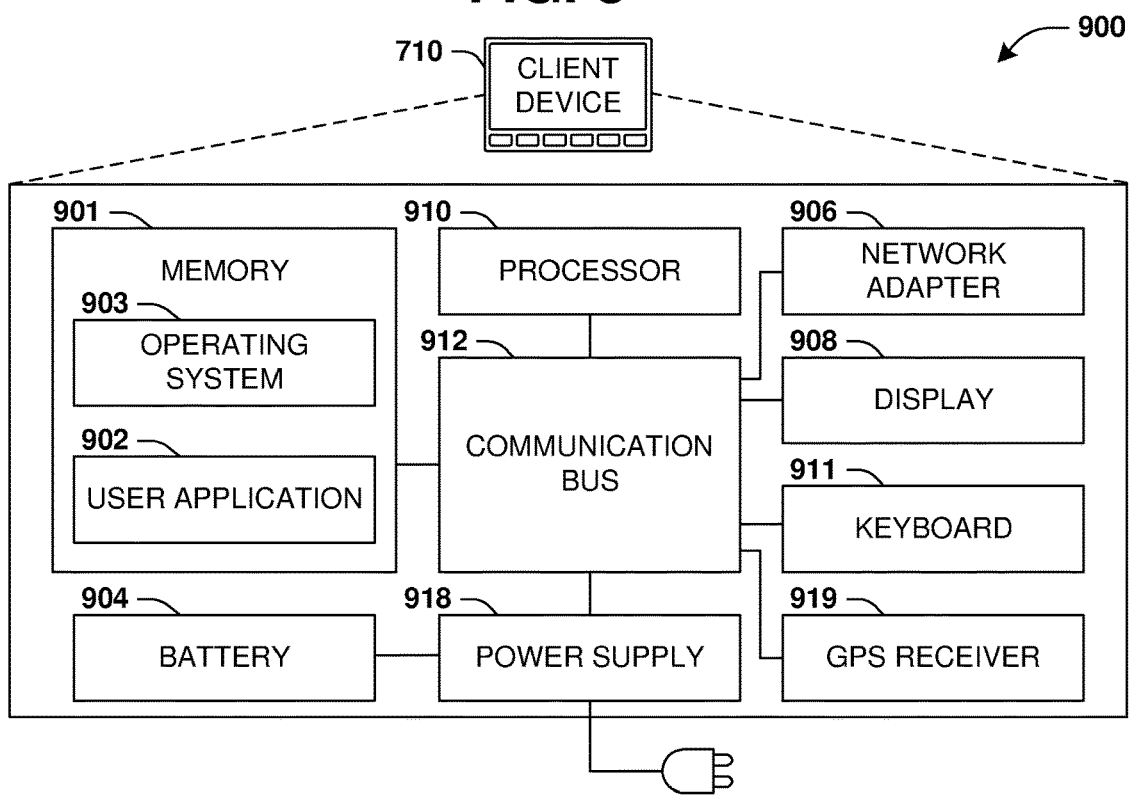
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
in response to receiving a first registration request, comprising a first device public key, from a first device associated with a mobile device number, creating a first registration comprising the first device public key;
in response to receiving a second registration request, comprising a second device public key, from a second device associated with the mobile device number, creating a second registration comprising the second device public key and transmitting a first notify message to the first device of the second registration and second device public key;
transmitting a second notify message to the second device of the first registration and first device public key;
routing a secure communication invite, comprising the second device public key, from the second device to the first device, wherein the secure communication invite is usable to determine whether the second device is being spoofed;
routing an encrypted message, comprising a first device private key, from the first device to the second device, wherein the encrypted message is encrypted using the second device public key in response to the first device authenticating the second device public key within the secure communication invite with the second device public key within the first notify message; and
facilitating end-to-end encrypted communication between a sender device and the first device and the second device using the first device private key.

2. The method of claim 1, comprising:
in response to receiving a subscribe request from the first device for event registration information, generating a first device event subscription; and
transmitting the first notify message to the first device based upon the first device event subscription.

3. The method of claim 1, comprising:
in response to receiving a subscribe request from the second device for event registration information, generating a second device event subscription; and
transmitting the second notify message to the second device based upon the second device event subscription.

4. The method of claim 1, comprising:
in response to receiving a publish request from the first device, generating a presence indicator for the first device, wherein the presence indicator comprises the first device public key received within the publish request; and
utilizing the presence indicator as an indication to the second device that the first device supports end-to-end encryption.

5. The method of claim 1, wherein the facilitating end-to-end encryption comprises:
routing encrypted communication from the sender device to the first device and to the second device based upon the first device and the second device having the same mobile device number.

6. The method of claim 5, wherein the encrypted communication is encrypted by the sender device using the first device public key, and wherein the encrypted communication can be decrypted by the first device and the second device using the first device private key.

7. The method of claim 1, wherein the encrypted message is decrypted using a second device private key of the second device to obtain the first device private key for use by the second device.

8. The method of claim 1, wherein the routing the encrypted message comprises:
routing the encrypted message as message session relay protocol message through a rich communication suite session by a routing agent.

9. The method of claim 1, wherein the first device public key is included within a contact header of the first registration request.

10. The method of claim 1, wherein the second device public key is included within a contact header of the second registration request.

11. A first device comprising:
a processor configured to execute a method comprising:
creating a first device public key and a first device private key for performing end-to-end encrypted communication with a sender device;
transmitting a registration request, comprising the first device public key, to a communication component for generating a first registration for the first device having a mobile device number, wherein the first registration comprises the first device public key;
receiving a notify message from the communication component, wherein the notify message comprises an indication of a second registration of a second device having the mobile device number and comprising a second device public key of the second device;
in response to receiving a secure communication invite comprising the second device public key, determining whether the second device is being spoofed by determining whether the second device public key within the secure communication invite matches the second device public key within the notify message; and
in response to a match being determined, transmitting an encrypted message comprising the first device private key encrypted using the second device public key to the second device for use in performing end-to-end encrypted communication between the second device and the sender device.

12. The first device of claim 11, wherein the first device private key is used by the first device and the second device to perform end-to-end encrypted communication with the sender device, and wherein communication from the sender device is transmitted to both the first device and the second device based upon the first device and the second device both having the same mobile device number, wherein the communication is encrypted using the first device public key and can be decrypted by the first device and the second device using the first device private key.

13. The first device of claim 11, wherein the method further comprises:

transmitting a publish request, comprising the first device public key to a presence server for generating a presence indicator for the first device, wherein the presence indicator comprises the first device public key; and utilizing the presence indicator as an indication to the second device that the first device supports end-to-end encryption.

14. The first device of claim 11, wherein the method further comprises:

in response to determining that the second device public key within the secure communication invite does not match the second device public key within the notify message, refraining from creating and transmitting the encrypted message.

15. The first device of claim 11, wherein the method further comprises:

in response to determining that the second device is being spoofed, triggering an alert of a spoofing attack of the second device.

16. The first device of claim 11, wherein the method further comprises:

including the first device public key within a contact header of the registration request.

17. The first device of claim 11, wherein the method further comprises:

transmitting a subscribe request to the communication component to register for receiving notify messages of devices with the mobile device number registering with the communication component.

18. A non-transitory computer-readable medium storing instructions that when executed facilitate performance of operations comprising:

creating a second device public key and a second device private key by a second device sharing a mobile device number with a first device configured to use a first device private key for performing end-to-end encrypted communication with a sender device;

transmitting a registration request, comprising the second device public key, to a communication component for generating a second registration for the second device, wherein the second registration comprises the second device public key;

receiving a notify message from the communication component, wherein the notify message comprises an indication of a first registration of the first device and comprising a first device public key of the first device;

transmitting a secure communication invite, comprising the second device public key, to the second device, wherein the secure communication invite is usable to determine whether the first device is being spoofed;

utilizing the second device private key to decrypt an encrypted message comprising the first device private key encrypted by the first device using the second device public key; and performing end-to-end encrypted communication with the sender device using the first device private key.

19. The non-transitory computer-readable medium of claim 18, wherein the first device private key is used by the first device and the second device to perform end-to-end encrypted communication with the sender device, and wherein communication from the sender device is transmitted to both the first device and the second device based upon the first device and the second device both having the same mobile device number, wherein the communication is encrypted using the first device public key and can be decrypted by the first device and the second device using the first device private key.

20. The non-transitory computer-readable medium of claim 18, wherein the operations comprise:

transmitting a subscribe request to the communication component to register for receiving notify messages of devices with the mobile device number registering with the communication component.

* * * * *